United States Patent [19]

Shirahata et al.

[11] Patent Number: 4,743,467
[45] Date of Patent: May 10, 1988

[54] METHOD FOR PREPARING MAGNETIC RECORDING MEDIUM

[75] Inventors: Ryuji Shirahata; Akio Yanai, both of Kanagawa, Japan

[73] Assignee: Fuji Photo Film Co., Ltd., Kanagawa, Japan

[21] Appl. No.: 96,203

[22] Filed: Sep. 8, 1987

Related U.S. Application Data

[63] Continuation of Ser. No. 9,068, Jan. 27, 1987, abandoned, which is a continuation of Ser. No. 579,322, Feb. 13, 1984, abandoned.

[30] Foreign Application Priority Data

Feb. 14, 1983 [JP] Japan ................................ 58-22373

[51] Int. Cl.4 ............................................. H01F 10/02
[52] U.S. Cl. ..................................... 427/132; 427/128; 427/250; 427/255.1; 427/255.3; 427/255.5; 428/900
[58] Field of Search ............ 427/128, 132, 250, 255.1, 427/255.3, 255.5; 428/900

[56] References Cited

U.S. PATENT DOCUMENTS 4,220,117 9/1980 Shinohara ........................... 427/132

FOREIGN PATENT DOCUMENTS 54-141111 11/1979 Japan .
55-12547 1/1980 Japan .

Primary Examiner—Bernard D. Pianalto
Attorney, Agent, or Firm—Sughrue, Mion, Zinn, Macpeak & Seas

[57] ABSTRACT

A method of preparing a ferromagnetic recording medium is disclosed. The method includes charging a ferromagnetic material in an evaporator. The material is then irradiated with an electron beam having a beam current density of at least 0.1 A/cm$^2$ in order to evaporate the material. The evaporated material is vapor deposited on a continuously travelling support in order to from the recording medium. The vapor deposition type magnetic recording medium produced has good metal film adhesion and durability.

10 Claims, 1 Drawing Sheet

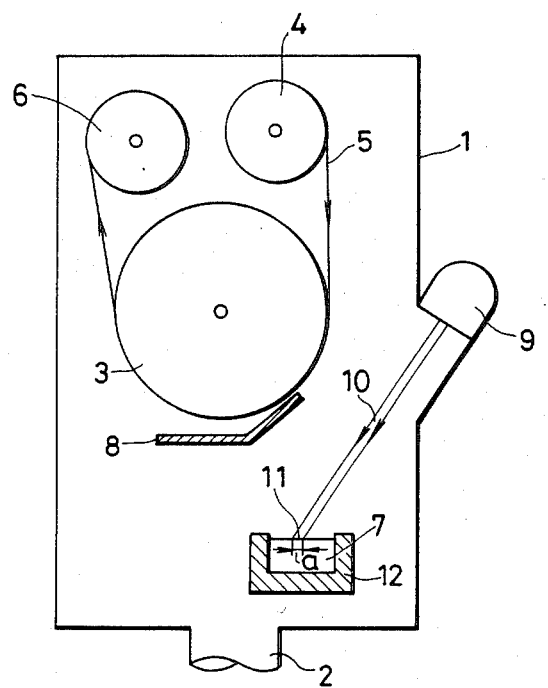

METHOD FOR PREPARING MAGNETIC RECORDING MEDIUM

This is a continuation of application Ser. No. 009,068, filed Jan. 27, 1987, which is a continuation of application Ser. No. 579,322, filed Feb. 13, 1984, both now abandoned.

FIELD OF THE INVENTION

The present invention relates to a method for preparing a magnetic recording medium having a magnetic thin film provided by vacuum deposition. More particularly, it relates to a method for preparing a magnetic recording medium having excellent adhesion of the magnetic thin film and durability during still mode use (hereinafter, still durability).

BACKGROUND OF THE INVENTION

Hitherto, a coated type magnetic recording medium has been widely used. Such coated type medium has been prepared by dispersing a ferromagnetic powder such as oxides, e.g., $\gamma\text{-Fe}_2\text{O}_3$, Co-doped $\gamma\text{-Fe}_2\text{O}_3$, $\text{Fe}_3\text{O}_4$, Co-doped $\text{Fe}_3\text{O}_4$, bertholide compounds of $\gamma\text{-Fe}_2\text{O}_3$ and $\text{Fe}_3\text{O}_4$ or $\text{CrO}_2$, or ferromagnetic alloy mainly comprising transition metals such as Co, Ni or Fe in an organic binder such as a copolymer of vinyl chloride and vinyl acetate, a copolymer of styrene and butadiene, an epoxy resin or a polyurethane resin, coating the resulting magnetic coating composition on a non-magnetic support, followed by orientation and drying.

In recent years, attention has been drawn to a thin metal film type magnetic recording medium having a magnetic recording layer of a ferromagnetic thin metal film which is prepared, without using an organic binder, by a vapour deposition method such as vacuum deposition as described in U.S. Pat. Nos. 4,354,908, 4,343,834, 4,245,008, 4,074,016, etc., sputtering as described in U.S. Pat. Nos. 3,856,579, 3,625,849, etc. or an ion plating as described in U.S. Pat. Nos. 3,898,952, 3,929,604, 4,002,546, etc. or a plating method such as an electric plating method as described in U.S. Pat. Nos. 2,927,889, 3,578,571, etc. or an electroless plating method as described in U.S. Pat. Nos. 4,072,781, 4,128,691, 4,250,225, etc. Various attempts have been made to put the products made by these methods into practical use due to the increased demand for high density magnetic recording.

In a conventional coated type magnetic recording medium, metal oxides having low saturation magnetization are mainly used as a magnetic material, and the content of the magnetic material in the coated type magnetic recording layer is about 30 to 50% by volume. Therefore, the currently used magnetic recording medium has reached its limit with respect to high output and high density recording. In addition, the manufacturing steps of coated type magnetic recording media are complicated and large auxiliary equipment is necessary to recover solvents or to prevent air pollution. On the other hand, the thin metal film type magnetic recording media are advantageous in that an extremely thin film of ferromagnetic metal having much higher saturation magnetization than magnetic composition of oxides can be formed without using non-magnetic materials such as an organic binder. With recent developments in high density magnetic recording technique, gap length of the magnetic head for recording and reproducing has narrowed to less than 1.0 $\mu$m and recording depth in the magnetic recording layer has become shallower. As a result, a thin metal film type magnetic recording medium in which the total thickness of the magnetic recording layer can be used for high output and high density recording. Of thin metal film type magnetic recording media, the magnetic recording medium having a magnetic recording layer prepared by vacuum deposition is more advantageous since the magnetic layer can be formed rapidly; the manufacturing process is relatively simple and the medium can be prepared by a dry process which does not necessitate disposing of waste solutions.

However, the vapour deposition type magnetic recording media still have problems, in particular low durability of the magnetic thin film. That is, the magnetic thin film is subjected to relative contact movement with a magnetic head during recording and reproducing magnetic signals and thus is very likely worn out and broken. Therefore, a magnetic recording layer of the magnetic recording medium must have a mechanical strength sufficient to endure contact movement with a magnetic head. However, the mechanical strength of the magnetic recording film formed by a conventional vapour deposition process is still unsatisfactory.

SUMMARY OF THE INVENTION

A primary object of the present invention is to provide a method for preparing a vapour deposition type magnetic recording medium having good metal film adhesion and good durability.

The objects of the invention can be attained by the present method of preparing a ferromagnetic recording medium. The method includes placing a ferromagnetic materials in an evaporator and then evaporating that material by irradiating it with an electron beam having a beam current density of at least 0.1 A/cm$^2$. The evaporated material is vapor deposited on a continuously travelling support in order to form the recording medium.

BRIEF DESCRIPTION OF THE DRAWING

FIGURE is a schematic view showing a typical apparatus used for practicing the method of the present invention.

DETAILED DESCRIPTION OF THE INVENTION

The present invention relates to an improved method for preparing a magnetic recording medium which comprises vapour depositing in vacuum atmosphere a ferromagnetic composition on a support which is continuously travelling, and irradiating the ferromagnetic composition charged in an evaporator with electron beams having a beam current density of at least 0.1 A/cm$^2$.

The method of this invention is now described in more detail with reference to the FIGURE which shows a schematic view of one embodiment of the apparatus used for practicing the present invention.

An inner portion of vacuum chamber 1 can be evacuated to vacuum through a gas exit 2. A cylindrical can 3 is installed in the vacuum chamber 1. A flexible support 5 such as a plastic polymer base is supplied from a feeding roll 4 and moves along the surface of the can 3. The support 5 is then wound by a winding roll 6. A ferromagnetic thin film can be formed by heat-evaporating a ferromagnetic material 7 through an opening of a suitable mask 8 on the support 5 which moves along the can 3. The ferromagnetic material 7 charged in a crucible 12 is heated and evaporated by an electron beam 10 irradiated by an electron beam gun 9. The electron beam 10 is deflected by a deflecting coil (not shown) and focussing by a focussing coil (not shown), and irradiated to the ferromagnetic material 7. Generally, the distance between the can 3 and the evaporator is 5 to 100 cm. It is important in the present invention that the density of electric beam current at the irradiation point 11 where the electron beam 10 is irradiated on the ferromagnetic material 7 is 0.1 A/cm$^2$ or more, preferably 0.2 A/cm$^2$ to 10$^3$ A/cm$^2$. The electric beam density used in the present invention can be defined as a value which is calculated by dividing the electric beam current by the irradiated beam spot area of the electron beam 10 at the irradiation point 11 ("a" in FIGURE).

As a result of various studies on the vapour deposition type recording medium, the present inventors have found that, in preparing a magnetic thin film by electron beam evaporation method, a magnetic recording medium having a magnetic thin film prepared by using a beam current density of at least 0.1 A/cm$^2$ has excellent film adhesion as well as durability.

Examples of ferromagnetic materials which can be used in this invention include a ferromagnetic metal such as iron, cobalt, nickel and ferromagnetic alloys such as Fe-Co, Fe-Ni, Co-Ni, Fe-Si, Fe-Rh, Co-P, Co-B, Co-Si, Co-V, Co-Y, Co-Ya, Co-La, Co-Ce, Co-Pr, Co-Sm, Co-Pt, Co-Mn, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni,W, Co-Ni-Re, Co-Ni-Sm and Co-Sm-Cu.

The degree of vacuum used in the method of this invention is preferably $1.0 \times 10^{-3}$ Torr to $1.0 \times 10^{-7}$ Torr. An oxidizing gas such as O$_2$ or an inactive gas such as Ar and He or a mixture thereof can be introduced into the vacuum atmosphere in order to control the magnetic properties and the like of the vapour deposited thin film.

Examples of electron beam guns used in the present invention include a Pierce type electron gun, a deflecting electron gun and a hollow cathode type electron gun.

The present invention is further illustrated in more detail by the following Examples, but the present invention is not limited thereto.

EXAMPLE 1

Magnetic recording tapes were prepared using Co-Ni (Ni content: 20 wt%) as a ferromagnetic material, and a polyethylene terephthalate film having a thickness of 15 μm as a flexible support in the apparatus as shown in the FIGURE. The degree of vacuum used was $1.5 \times 10^{-5}$ Torr. Magnetic recording tapes having a vacuum deposited magnetic film layer was prepared at various beam current densities, and the film adhesion and durability in each of the resulting magnetic tapes were evaluated by strip-tests using an adhesive tape as described in Handbook of Thin Film Technoloty edited by L. I. Maissel & R. Glang McGraw-Hill Book Co. (1970) pp. 12-26 and in terms of the still durability (minutes) using in Table 1 below.

TABLE 1

| Electron Beam Current Density (A/cm$^2$) | Film Adhesion | Time Durability at Still Mode |
|---|---|---|
| 0.02 | poor | 1 min. |

TABLE 1-continued

| Electron Beam Current Density (A/cm$^2$) | Film Adhesion | Time Durability at Still Mode |
|---|---|---|
| 0.08 | poor | 1 min. |
| 0.10 | good | 25 min. |
| 0.18 | good | 30 min. |
| 0.25 | good | 40 min. |
| 0.40 | good | 40 min. |
| 0.60 | good | 45 min. |

It is apparent from the above results that a magnetic recording tape having excellent film adhesion and durability can be obtained by using an electron beam current density of at least 0.10 A/cm$^2$.

EXAMPLE 2

Magnetic recording tapes were prepared using Co as a ferromagnetic material and a polyethylene terephthalate film having a thickness of 10 μm as a flexible support in the apparatus as shown in the FIGURE. The degree of vacuum was adjusted to $1.0 \times 10^{-4}$ Torr by introducing an oxygen gas. Film adhesion and durability of the resulting magnetic recording tapes having a vapour deposited magnetic film layer with various beam current densities were evaluated in the same manner as described in Example 1. The results obtained are shown in Table 2 below.

TABLE 2

| Electron Beam Current Density (A/cm$^2$) | Film Adhesion | Time Durability at Still Mode |
|---|---|---|
| 0.01 | poor | 2 min. |
| 0.05 | poor | 3 min. |
| 0.10 | good | 28 min. |
| 0.20 | good | 29 min. |
| 0.40 | good | 40 min. |

It is apparent from the above results that a magnetic recording tape having excellent film adhesion and durability can be obtained by using an electron beam current density of at least 0.10 A/cm$^2$.

While the invention has been described in detail and with reference to specific embodiments thereof, it will be apparent to one skilled in the art that various changes and modifications can be made therein without departing from the spirit and scope thereof.

What is claimed is:

1. A method for preparing a magnetic recording medium, comprising the steps of:
    charging a ferromagnetic material in an evaporator;
    irradiating the ferromagnetic material with an electron beam having a beam current density of between 0.1 A/cm$^2$ and 0.6 A/cm$^2$ to evaporate the material; and
    vapour depositing the evaporated material on a continuously traveling support to form the recording medium.

2. A method as claimed in claim 1, wherein the electron beam has a beam current density of 0.2 A/cm$^2$ to 0.6 A/cm$^2$.

3. A method as claimed in claim 1, wherein the method is carried out by maintaining the ferromagnetic material and continously traveling support in an atmosphere having a vacuum in the range of $1.0 \times 10^{-3}$ to $1.0 \times 10^{-7}$ Torr.

4. A method as claimed in claim 3, wherein the atmosphere includes an oxidizing gas.

5. A method as claimed in claim 3, wherein the atmosphere includes an inactive gas.

6. A method as claimed in claim 4, wherein the oxidizing gas is oxygen.

7. A method as claimed in claim 5, wherein the oxidizing gas is selected from the group consisting of Ar, He and mixtures thereof.

8. A method as claimed in claim 1, wherein the irradiation is carried out using an electron beam gun of the type selected from the group consisting of a Pierce type electron gun, a deflecting electron gun and a hollow cathode type electron gun.

9. A method as claimed in claim 1, wherein the ferromagnetic material is a ferromagnetic metal selected from the group consisting of iron, cobalt, nickel and ferromagnetic alloys.

10. A method as claimed in claim 1, wherein the ferromagnetic material is a ferromagnetic alloy selected from the group consisting of Fe-Co, Fe-Ni, Co-Ni, Fe-Si, Fe-Rh, Co-P, Co-B, Co-Si, Co-V, Co-Y, Co-Ya, Co-La, Co-Ce, Co-Pr, Co-Sm, Co-Pt, Co-Mn, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W, Co-Ni-Re, Co-Ni-Sm and Co-Sm-Cu.

* * * * *